US007027258B2

(12) United States Patent
Hoelsaeter et al.

(10) Patent No.: US 7,027,258 B2
(45) Date of Patent: Apr. 11, 2006

(54) RECORDING TAPE CARTRIDGE LOAD AND LOCK METHOD

(75) Inventors: Haavard Hoelsaeter, Oslo (NO); Haavard Holmedal, Oslo (NO)

(73) Assignee: Tandberg Data ASA, Oslo (NO)

( * ) Notice: Subject to any disclaimer, the term of this patent is extended or adjusted under 35 U.S.C. 154(b) by 298 days.

(21) Appl. No.: 10/376,666

(22) Filed: Feb. 27, 2003

(65) Prior Publication Data

US 2004/0169954 A1  Sep. 2, 2004

(51) Int. Cl.
G11B 15/675 (2006.01)
G11B 17/00 (2006.01)
G11B 5/008 (2006.01)

(52) U.S. Cl. ............................................. 360/96.5

(58) Field of Classification Search ............... 360/96.5, 360/96.1, 93, 90, 88, 85
See application file for complete search history.

(56) References Cited

U.S. PATENT DOCUMENTS

| 4,638,386 | A | * | 1/1987 | Takamatsu | .................. 360/96.5 |
| 5,172,362 | A | * | 12/1992 | Hattori et al. | .............. 720/633 |
| 5,870,246 | A | | 2/1999 | Hoelsaeter | .................. 360/96.5 |
| 5,883,754 | A | * | 3/1999 | Kobayashi | .................. 360/96.5 |
| 6,392,837 | B1 | | 5/2002 | Kim | .......................... 360/96.5 |

FOREIGN PATENT DOCUMENTS

| DE | 3904483 C | * | 3/1990 |
| DE | 4229754 A | * | 3/1994 |
| JP | 53-114409 | * | 10/1978 |
| JP | 03-283042 A | * | 12/1991 |

* cited by examiner

Primary Examiner—Julie Anne Watko
(74) Attorney, Agent, or Firm—Schiff Hardin LLP (57) ABSTRACT

In a method and system for loading and locking a recording tape cartridge in a drive, the cartridge is inserted into a load box in the drive. The load box containing the cartridge is moved in a vertical direction while maintaining the load box and cartridge substantially level. In a final downward operation position, the cartridge is engaged by a drive interface.

9 Claims, 8 Drawing Sheets

RECORDING TAPE CARTRIDGE LOAD AND LOCK METHOD

BACKGROUND OF THE INVENTION

When loading recording tape cartridges into a drive unit, it is known that reference pins are typically employed to position the cartridge when loaded. The cartridge must also be engaged by a cartridge interface of a motor. Although cartridges can be loaded manually, automatic loading is preferred. However, automatic loading of cartridges into a drive employing reference pins can require an expensive and complicated loading system for accurately placing the cartridge which has high cost, is space inefficient, and is not operator friendly.

SUMMARY OF THE INVENTION

It is an object of the present invention to provide a low cost, space efficient, and simplified loading and locking system for accurately loading a cartridge into a drive and locking it onto reference pins, and a cartridge drive of a motor.

According to the present invention for loading and locking a recording tape cartridge in a drive, the cartridge is inserted into a load box in the drive. The load box containing the cartridge is moved in a vertical direction while maintaining the load box and cartridge substantially level. In a final downward operation position, the cartridge is engaged by a drive interface.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Figure 1:
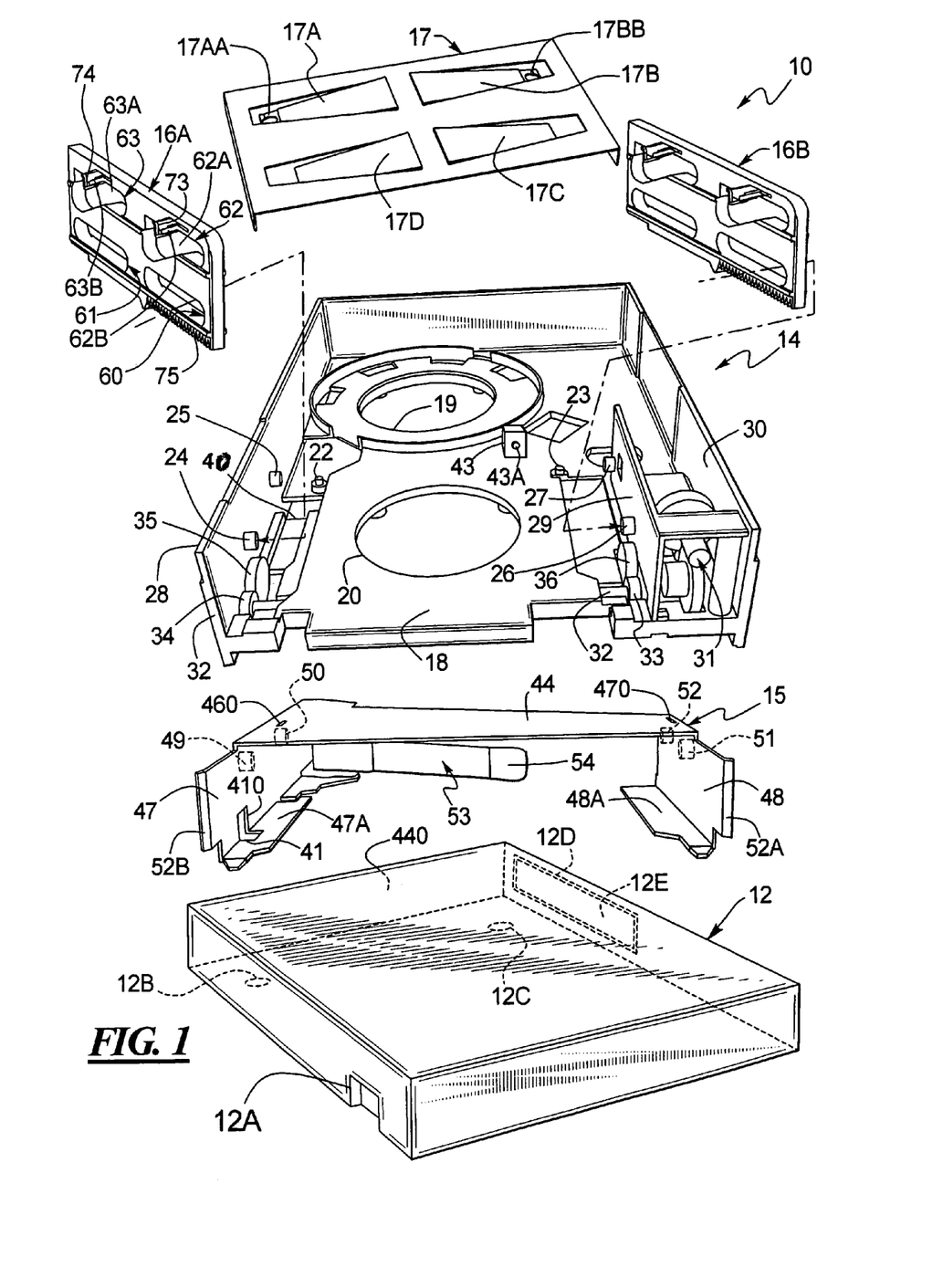
FIG. 1 is a perspective exploded view showing principle components of the recording tape, cartridge load and lock system.

The recording tape cartridge load and lock system in a tape drive 10 is generally shown in exploded view in FIG. 1. FIG. 1 shows the main components of the system.

An insertable cartridge 12 containing recording tape has a horizontally slidable spring loaded door 12E, which opens to provide an access opening 12D for magnetic head access. The cartridge also has a locking recess 12A. This cartridge is received into the drive 10 in which the cartridge 12 must be loaded and locked. The tape drive 10 is formed of the following main components shown in FIG. 1: a main chassis 14, a load box 15 for receiving the cartridge 12; first and second cam slides 16A, 16B which guide, position, and move the load box 15 vertically after the cartridge has been loaded therein; and a top spring 17 received on the chassis 14 and connected to the load box 15 via spring arms 17A and 17B to position the same and bias it in a downward direction by use of the spring arms 17A, B, C, D.

Principle aspects of the main chassis 14 will first be described. In a floor 18, a take-up drive aperture 19 and a drive aperture 20 for receiving a motor cartridge drive interface 21 (FIG. 2) are provided.

The chassis floor 18 also has two reference pins 22 and 23 received in respective apertures 12B, 12C on the cartridge 12 when the cartridge is moved downwardly to its operation position.

Chassis 14 also has first and second stationary cam rollers 24 and 25 mounted inwardly on a vertical side wall 28 at one side of the chassis 14 and stationary cam rollers 26 and 27 mounted on a vertical inner side wall 29 at the other side of the chassis 14.

Between the inner side wall 29 and the outer side wall 30 of the chassis 14 is provided a cam motor and associated drive gears as generally indicated at 31. These drive gears drive a synchronization axle 32 (see FIG. 5). The synchronization axle 32 has final drive gears 33 and 34 as shown in FIG. 5 most clearly, and which interact with transport gears 36 and 35.

Figure 2:
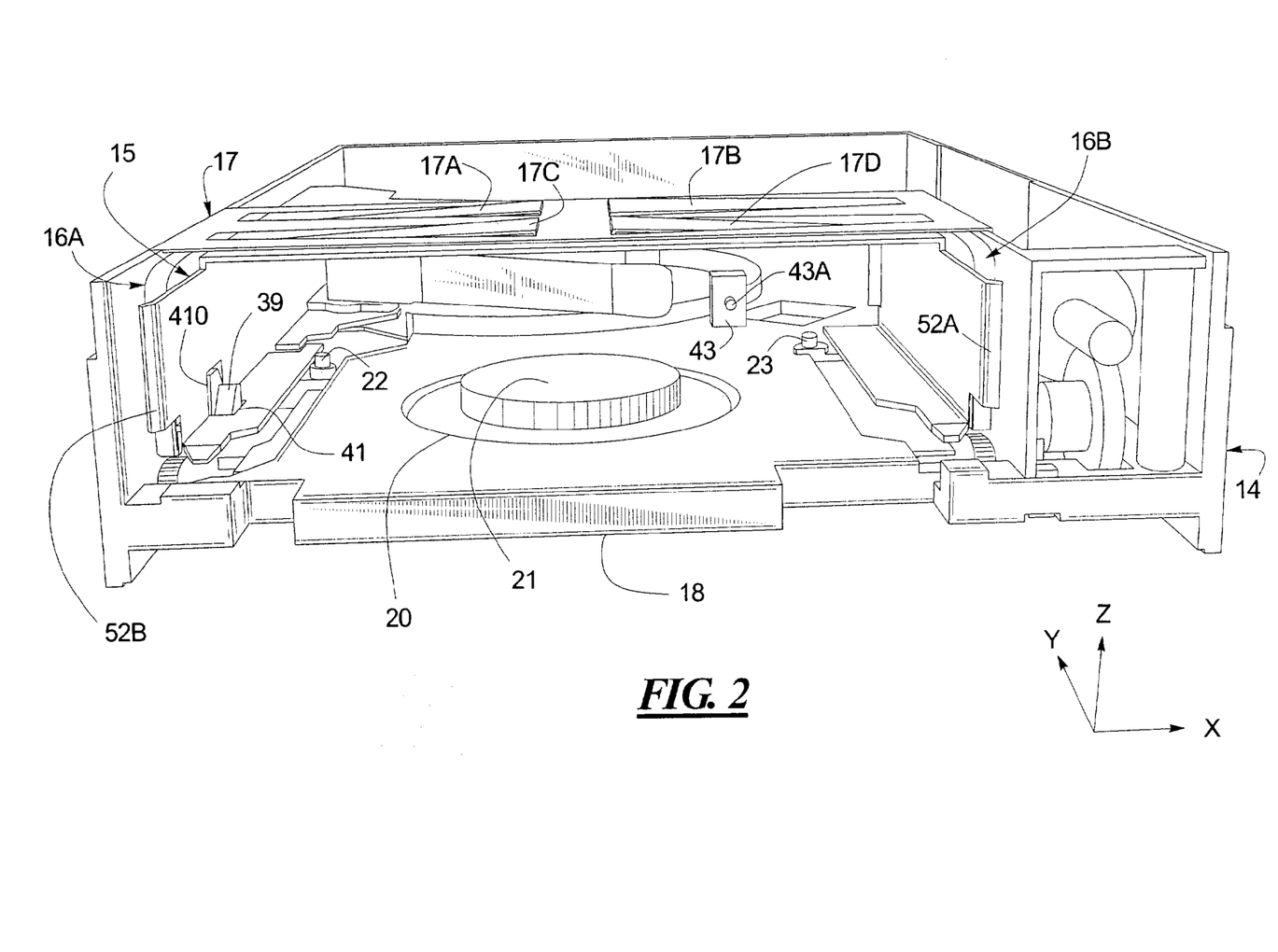
FIG. 2 is a front perspective view of the assembled system of FIG. 1, but without the cartridge.
Figure 4:
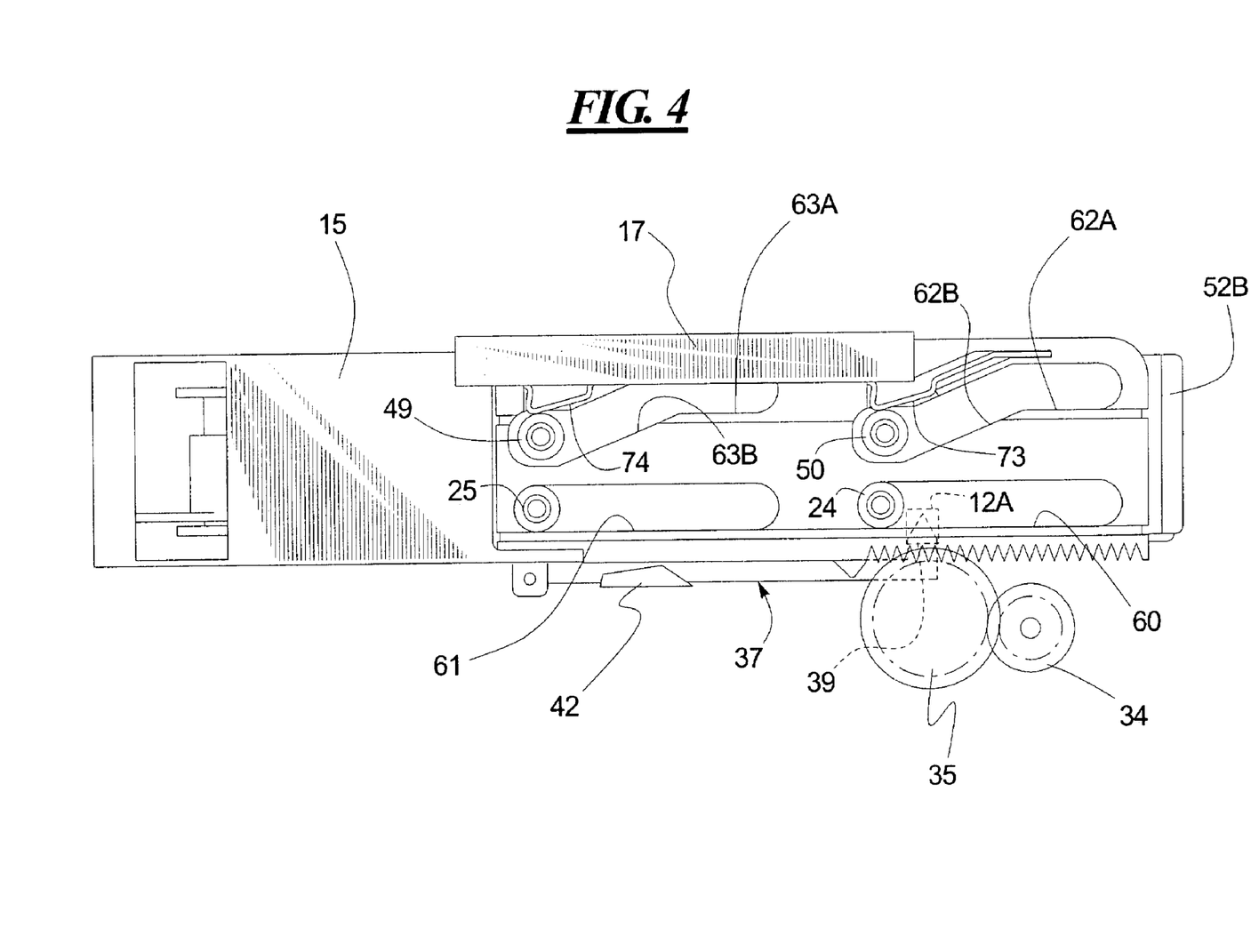
FIG. 4 shows the cartridge in the operation ready position after loading.
Figure 5:
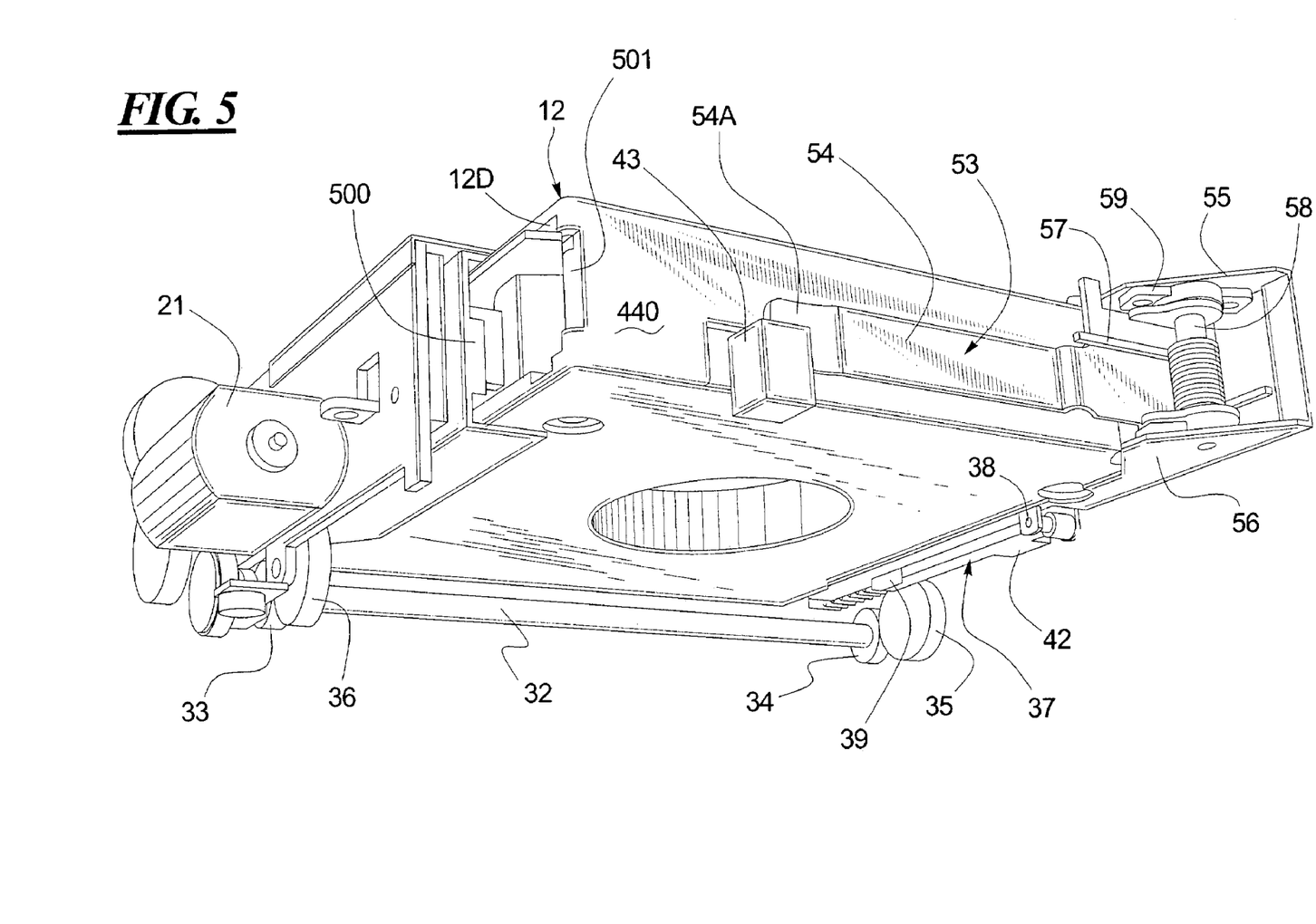
FIG. 5 shows a perspective back view of the system with the cartridge in the operation ready position.

Mounted beneath the floor surface 18 of the chassis 14 as shown more clearly in FIG. 5 hereafter is a cartridge lock arm 37 which at one end is spring-loaded and pivotable about a pivot pin 38. The spring loading at pivot pin 38 forces the lock arm 37 upwardly against the bottom surface 18 of the chassis as shown in FIG. 2. Furthermore, the lock arm 37 has at its opposite end an engagement member 39 having a vertical engagement surface 39A and an upper slanted cam surface 39B. Member 39 passes through an aperture 40 (FIG. 1) in the chassis floor 18 and then through a load box aperture (FIG. 1) having a side cut 410 and a bottom aperture 41. This operating arm 37 also has a cam surface 42 as most clearly shown in FIGS. 3–8.

As shown in FIGS. 1 and 2, a surface sensor 43 is provided for detecting when the leading wall 440 of the cartridge 12 has been fully inserted in the load box 15 described hereafter.

The top spring 17 is mounted and fastened to the side wall 28 and the inner side wall 29 at the top of those walls. The four spring arms 17A–D push down on the top of the load box 15, and also locate the load box 15 as described hereafter.

The load box 15 has a top surface 44 with respective slots 460 and 470, which respectively receive tabs 17AA and 17BB of the spring arms 17A and 17B. These tabs together with the cam rollers 24, 25 and 26, 27 maintain the load box 15 in a fixed position in the X and Y directions.

FIG. 2 shows the X, Y and Z directions of the system for reference. Y represents the insertion direction for the cartridge, X represents the lateral direction with respect to the insertion direction, and Z represents the vertical movement direction. The cartridge and its associated load box move from the initial position after initial loading of the cartridge down to the vertical position where the load box places the cartridge into a locked position with respect to the reference pins and for drive with the cartridge drive interface 21 as shown in FIG. 2. In this downward position, the cartridge 12 is then also positioned by the reference pins 22 and 23 received in locating apertures 12B and 12C.

The load box 15, as previously described, has the upper surface 44 with the spring arm slots 46Ø and 47Ø. First and second vertical side walls 47 and 48 are provided downwardly from the top surface 44. These side walls have a lower respective lip 47A and 48A on which edges of the cartridge rest.

On outer surfaces of the sidewalls 47 and 48 respective load box cam rollers 49 and 50 (side wall 47) and 51 and 52 (side wall 48) are provided. These can be most clearly seen in FIG. 1 and in FIG. 3 and have been represented in FIG. 1 by dashed lines since they are on the unviewable side in FIG. 1 of the respective walls 47 and 48. The side walls 47 and 48 also have a leading edge outwardly curved portions 52B and 52A, respectively.

An eject arm mechanism 53 is mounted at one end of the load box at tab portions 55 and 56 as most clearly shown in FIG. 5. This mechanism has an eject arm 54 having a contact portion 54A for pushing on the leading wall 44Ø of the cartridge 12. It is spring-loaded by spring 57 and pivots about axle 58. A damper 59 is provided to dampen action of the eject arm mechanism 53 so that it gently pushes the cartridge during unloading as described hereafter.

Vertical motion of the load box and its associated cartridge is controlled by the first and second cam slides 16A and 16B shown in FIG. 1. Since these cam slides are identical, only one will be described.

Figure 3:
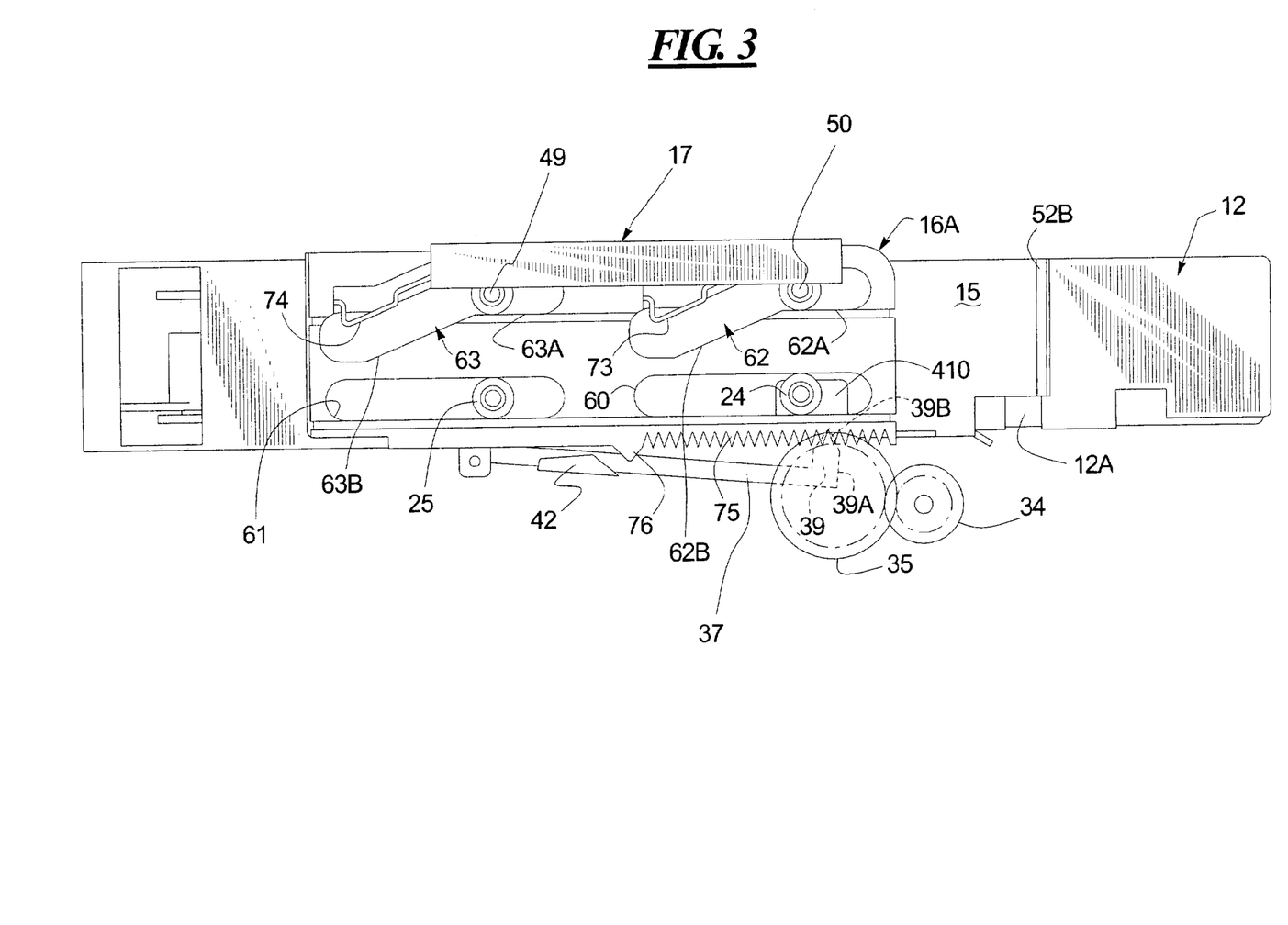
FIG. 3 shows insertion of a cartridge in the system.

As shown in FIGS. 1 and 3 cam slide 16A has horizontal guide grooves 60 and 61 for receiving main chassis stationary cam rollers 24 and 25 respectively. Cam slide 16A also has two-segment vertical positioning guide grooves 62 and 63 respectively receiving the respective cam rollers 50 and 49 of the vertically movable load box 15. These vertically positioning guide grooves have a horizontal segment 62A, 63A and a slanting segment 62B, 63B. The slanting segments have respective cam slider springs 73 and 74.

At the base of the cam slide 16A is provided linear gear tooth 75 followed by a projection cam 76 as most clearly shown in FIG. 3. As shown in FIG. 3, this projection cam 76 interfaces with cam surface 42 of the lock arm 37.

FIG. 2 shows in perspective view the assembled components shown in exploded view in FIG. 1, but without insertion of the tape cartridge for clarity. In FIG. 2, the load box 15 is in its raised position ready to receive the tape cartridge 12. Drive cartridge interface 21 is shown in place. Also, the reference pins 22 and 23 can be seen. As the load box lowers the tape cartridge into position over these reference pins, the cartridge interface of the motor engages a spool in the tape cartridge. The magnetic head system which engages the tape for reading and writing data or the like therefrom is not shown since it is not part of the present invention, directed to a cartridge loading and locking system.

In FIG. 2 it can be seen how the spring arms 17A, B, C, D on the top spring 17 press down on the top surface 44 of the load box 15.

Below by reference to FIGS. 3–8, operation of the cartridge load and lock system will be explained. In FIGS. 3–8, the outer chassis 14 has not been shown for clarity.

In the side view of FIG. 3, the cartridge 12 is initially loaded into the load box 15. Since the cam wheels 49 and 50 are positioned in the horizontal segment 62A, 63A of the vertical positioning grooves 62 and 63 of the cam slide 16A, the load box 15 is in its raised position for receiving the cartridge 12. In this state, the cartridge lock arm 37 has its projection 39 extending through the aperture 40 of the chassis and aperture 41 of the load box as shown in FIG. 2.

As the cartridge 12 is inserted as shown in FIG. 5, the side door 12E of the cartridge 12 will open to expose access opening 12D as the load box cartridge door opening portion 500 strikes the leading edge of the side door 12E as it passes through cartridge clearance cut-out 501. When the leading wall 44Ø bottom edge of the cartridge 12 strikes the lock arm projection cam surface 39B it pushes the lock arm 37 downwardly so that the tip of the projection 39 then slides along the bottom of the cartridge 12 during insertion.

As insertion continues, the leading end wall 44Ø of the cartridge 12 strikes the abutment portion 54A of the eject arm 54 opposing the spring bias on the arm. Finally, when the cartridge is in its final position, a button 43A on the sensor 43 is engaged and the projection 39 on the lock arm 37 engages upwardly into a side and bottom locking recess 12A of the cartridge 12.

Because of the activation of the sensor 43, the cam loader through the gearing initiates rotation of the transport gear 35 causing both cam slides 16A and 16B to move to the right. Since the cam slides 16A and 16B are both identical, hereafter in FIG. 3 and in subsequent figures the description will be limited only to the action of the one cam slide 16A, but it is understood that similar actions are occurring at the other cam slide 16B.

As the lock box cam wheels 49 and 50 leave the straight segment 62A and 63A, they enter into the slant segment 62B and 63B, causing the load box to descend in view of the spring bias by the spring arms pushing down on the top of the load box.

As shown in the side view of FIG. 4, the load box is now in its most downwardly negative Z-direction operation position wherein the reference pins and the cartridge interface are fully engaged with the cartridge. At this time, the cam motor and gearing stops drive of the transport gear 35 and the cam wheels 24, 25, 49 and 50 have reached the end of respective guide grooves. Motor stoppage can be achieved by sensing motor current, or with other sensing approaches not shown such as with a switch or the like. Here, not only the four spring arms 17A–D is pushing down on the load box, but so are the slide springs 73, 74.

With the present system, there is the advantage that the load box with its contained cartridge descends downwardly in a smooth, even manner and remains level. Also, during the descending operation, the load box and the cartridge inside thereof are rigidly locked in position in the X-Y plane. This ensures accurate engagement of the reference pins and the motor cartridge interface. Moreover, the cartridge 12 is securely locked within the load box by the engagement of vertical surface 39A of projection 39 the lock arm 37 in the locking recess 12A of the cartridge 12.

FIG. 5 shows a rear perspective view of the load box in its operational position with the eject arm fully deflected and the cartridge contacting the cartridge in-place sensor 43.

Figure 6:
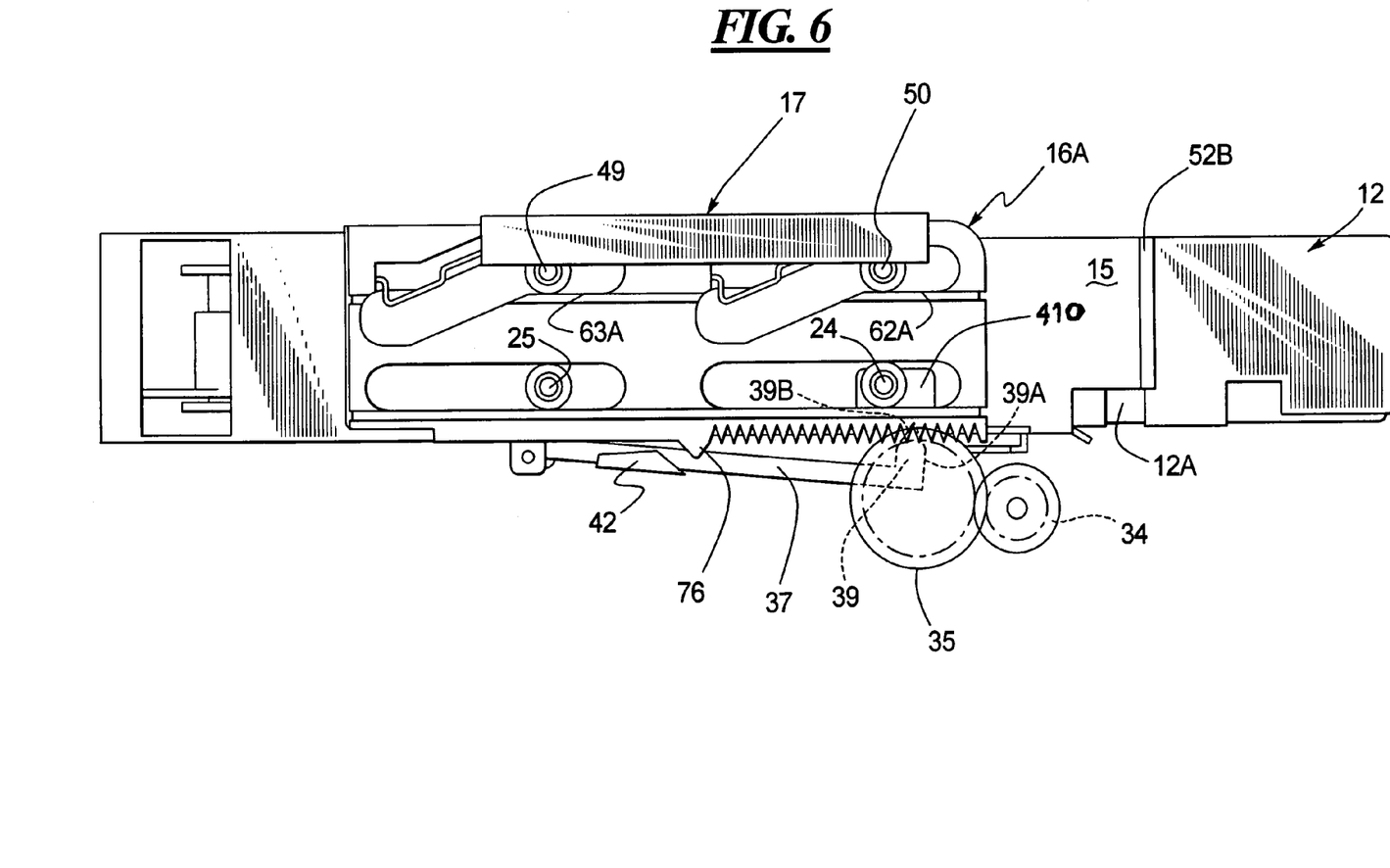
FIG. 6 is a side view showing ejection of the cartridge.

Now the cartridge unloading the cycle will be described. With reference to FIG. 6, after the operator of the cartridge drive initiates a signal that it is desired to unload the cartridge, that signal then activates the cam motor to run in the reverse direction compared to the load cycle, causing the two cam sliders 16A, 16B to move in the Y-direction. The load box will be lifted in the positive Z-direction due to the cam slide grooves acting on the respective cam rollers. As this occurs, the load box is forced up against the pressure of the aforementioned spring-arms 17A–D. In FIG. 6, the load box is now in its maximum lifted positive Z-direction, but the cam surface 42 has not yet engaged the projection cam 76 of the lock arm 37. In the load box position of FIG. 6, the load box cam wheels 49 and 50 are now in the horizontal segment 62A, 63A of the guide channels 62 and 63.

After further rotation of the drive wheel 35, the cam slide 16A has moved to its leftmost position wherein the cam rollers 49, 50 or at the leftmost end of the respective guide grooves. The cam loader operation is stopped at this point by any of a variety of techniques such as sensing motor current, using a sensing switch, or the like, not shown.

Figure 7:
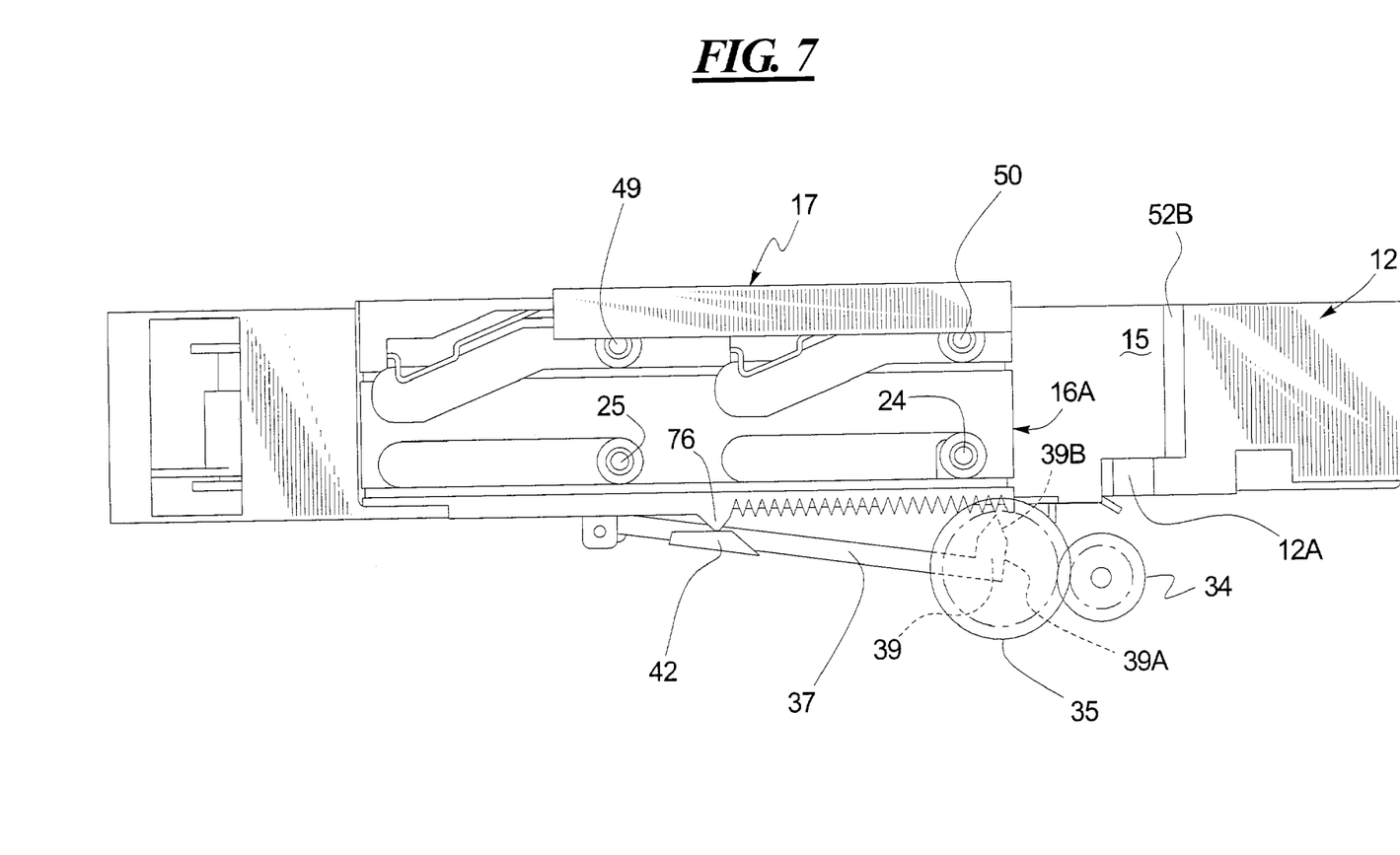
FIG. 7 is a side view showing the position of the cartridge just prior to removal.

As shown in FIG. 7, the cam surface 42 on the lock arm 37 is pushed down by the projection cam 76 causing a downward deflection of the spring loaded lock arm 37. This causes a disengagement of the projection 39 from the cassette side bottom locking recess 12A.

Figure 8:
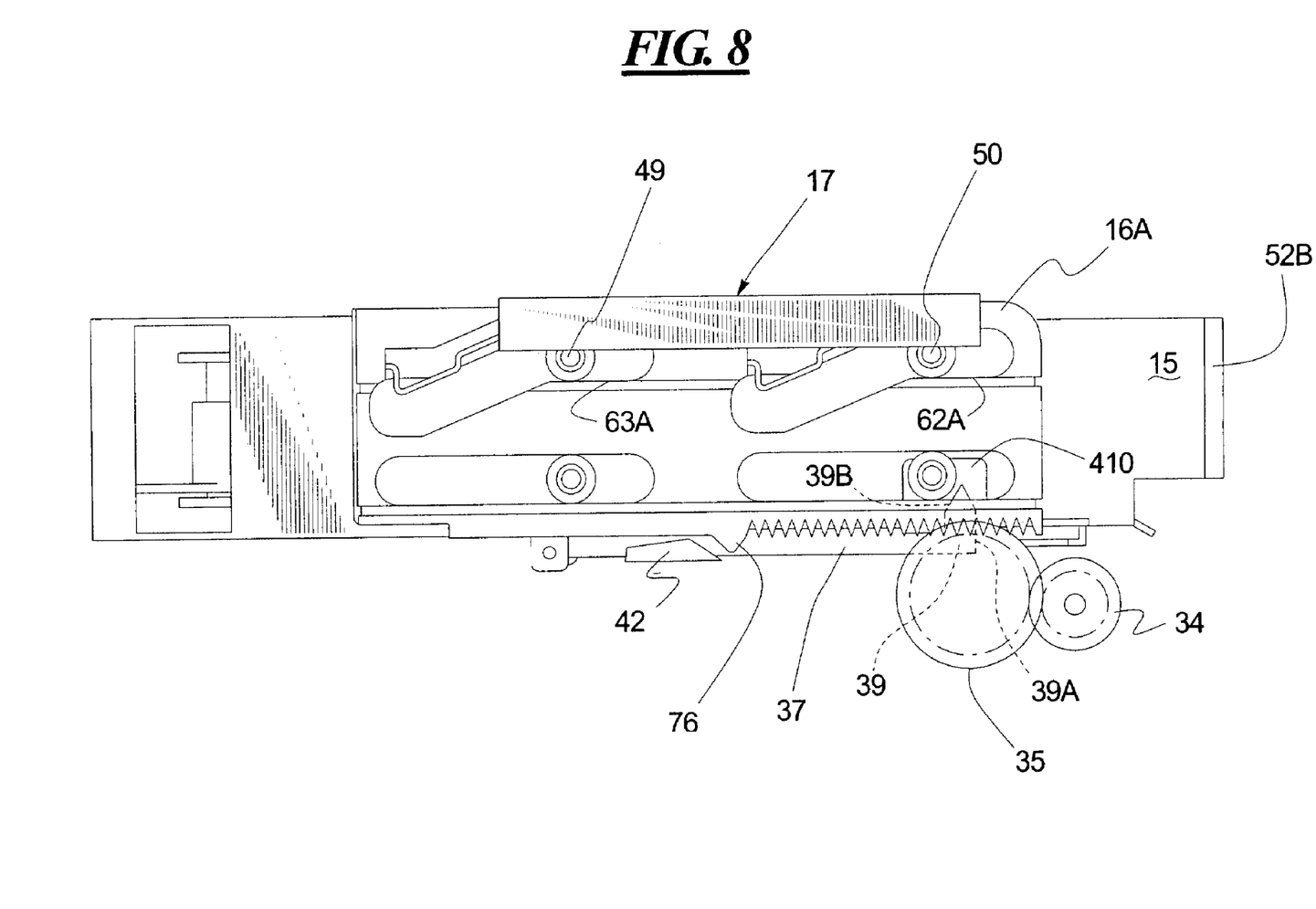
FIG. 8 is a side view showing the drive after the cartridge has been removed by the operator.

When the system is then in the position as shown in FIG. 7, the eject arm will now rotate around the mounting axis and force the cartridge out with a controlled velocity to a predefined cartridge eject position. As this is occurring, the cam motor again reverses direction such as by current sensing or a switch not shown (not part of this invention) to drive the transport wheel 35 to cause the cam slide 16A to again move to the right to a final position as shown in FIG. 8, where the cartridge is not shown since it is removed by the operator. This final position and shut-off of the motor can be defined with a sensing switch not shown, counting gear revelation, or the like. It may be noted that the cam surface 42 is no longer engaged by projection cam 76 in FIG. 8, thus allowing the lock arm 37 to renew its biased position against the bottom of the cassette. The cassette is now removed. The system is now ready to start the load cycle all over again as shown in FIG. 3.

With the system and method described, a low cost, space efficient and simplified load and lock concept is provided in a reliable manner. Importantly, during the locking procedure, as the cartridge descends, it remains level in a rigid X-Y plane in a locked position for an accurate engagement of the reference pins and cartridge interface of the drive motor. Furthermore, a strong downward force is exerted on the load box and its contained cartridge by the action of not only the spring arms of the top spring but also by the four slide springs in the slant segments of guide grooves. Thus, the downward forces being exerted on the load box are evenly distributed across the top of the load box and also at the two sides.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for loading and locking a recording tape cartridge in a drive, comprising the steps of:
   inserting the cartridge into a load box in the drive and preventing movement of the cartridge in any direction in a horizontal plane wherein after the cartridge has reached a maximum insertion direction in the load box during loading, with a locking member locking the cartridge in position in the load box;
   moving the load box containing the cartridge in a vertical direction while maintaining the load box and cartridge substantially level in said horizontal plane; and
   in a final downward operation position, the cartridge being engaged by a reference member and a drive interface.

2. The method according to claim 1 wherein for unloading the cartridge, the load box moves back up vertically while remaining substantially level, and when it reaches a maximum vertical position, the cartridge is automatically at least partially ejected.

3. The method according to claim 1 wherein the load box descends during the loading operation by use of cam members guided by a slant segment of a guide groove in a cam slide which is moving horizontally with respect to the load box.

4. The method according to claim 3 including the step of providing two of said slides each having two horizontal guide grooves and two guide grooves having a slanting segment.

5. The method according to claim 3 including the step of providing a guide spring at an end of the slant segment of the guide grooves.

6. The method according to claim 1 including the steps of providing cam members on a chassis, the cam members being received in guide grooves of cam slides, providing cam members on the load box, the load box cam members being received in a slant segment of a guide groove of the cam slides, and moving the cam slides horizontally as the load box descends.

7. The method according to claim 1 including the step of providing at least one spring which presses down on a top of the load box as it descends toward the operation position.

8. A method for loading and locking a recording tape cartridge in a drive, comprising the steps of:
   providing a spring system which presses down on a top of a load box as it descends toward an operation position and which prevents movement of the load box in a horizontal plane;
   inserting the cartridge into the load box in the drive;
   moving the load box containing the cartridge in a vertical direction while maintaining the load box and cartridge substantially level; and
   in a final downward operation position, the cartridge being engaged by a drive interface.

9. A method for loading and locking a recording tape cartridge in a drive, comprising the steps of:
   inserting the cartridge into a load box in the drive and preventing movement of the cartridge in any direction in a horizontal plane;
   moving the load box containing the cartridge in a vertical direction while maintaining the load box and cartridge substantially level in said horizontal plane, the load box descending during the loading operation by use of cam members guided by a slant segment of a guide groove in a cam slide which is moving horizontally with respect to the load box, a guide spring being provided at an end of the slant segment of the guide grooves; and
   in a final downward operation position, the cartridge being engaged by a reference member and a drive interface.

* * * * *